United States Patent
Botros et al.

(10) Patent No.: US 7,030,188 B2
(45) Date of Patent: Apr. 18, 2006

(54) MULTI-PHASE POLYPROPYLENE COMPOSITIONS

(75) Inventors: Maged G. Botros, West Chester, OH (US); Mark P. Mack, West Chester, OH (US); James H. Meas, Corpus Christi, TX (US); Clifford C. Lee, Pearland, TX (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/816,389

(22) Filed: Apr. 1, 2004

(65) Prior Publication Data

US 2005/0222327 A1 Oct. 6, 2005

(51) Int. Cl.
*C08L 51/06* (2006.01)

(52) U.S. Cl. .............................. 525/63; 525/66; 525/67; 525/69

(58) Field of Classification Search .................. 525/66, 525/63, 67, 69
See application file for complete search history.

(56) References Cited

U.S. PATENT DOCUMENTS

| | | | |
|---|---|---|---|
| 4,990,550 A | 2/1991 | Iwanami et al. | |
| 5,317,059 A | 5/1994 | Chundury et al. | |
| 5,324,755 A | 6/1994 | Kilius et al. | |
| 5,367,022 A | 11/1994 | Kiang et al. | |
| 5,514,745 A | 5/1996 | Yoshino | |
| 6,270,883 B1 | 8/2001 | Sears et al. | |
| 6,303,682 B1 * | 10/2001 | Shin et al. | ........... 524/462 |
| 6,716,928 B1 | 4/2004 | Botros | |
| 2001/0033924 A1 | 10/2001 | Qian et al. | |

FOREIGN PATENT DOCUMENTS

| | | |
|---|---|---|
| WO | WO 97/33941 | 9/1997 |
| WO | WO 02/059196 A1 | 8/2002 |

OTHER PUBLICATIONS

Ross, James F., et al.: *Ind. Eng. Chem. Prod. Res. Dev*, (1985) 24: pp. 194-154: "An Improved Gas-Phase Polypropylene Process.".

Mieck, K.-P., et al.: *Polymer Composites*, vol. 17: 6 (Dec. 1996), pp. 873-878: "Needle-Punched Hybrid Nonwovens of Flax and PP Fibers—Textile Semiproducts for Manufacturing of Fiber Composites.".

Note: U.S. appl. No. 10/222,568 is now U.S. patent 6,716,928 (provided above).

* cited by examiner

*Primary Examiner*—Jeffrey Mullis
(74) *Attorney, Agent, or Firm*—William A. Heidrich; Gerald A. Baracka

(57) ABSTRACT

Improved multi-phase polypropylene composites are provided. The compositions are comprised of a polypropylene base resin, a non-compatible dispersed phase which can be a polymer or filler material and a propylene-ethylene copolymer grafted with a carboxylic acid or carboxylic acid derivative.

7 Claims, No Drawings

MULTI-PHASE POLYPROPYLENE COMPOSITIONS

BACKGROUND OF THE INVENTION

1. Field of the Invention

This invention relates to compositions of polypropylene and grafted propylene copolymer. More specifically, the invention relates to multi-phase compositions having improved properties comprising polypropylene, a non-compatible polymer and/or filler and a propylene-ethylene copolymer grafted with carboxylic acids or derivatives. Preferably the grafted propylene-ethylene copolymer is an impact copolymer having a high graft concentration and relatively low melt flow rate.

2. Description of the Prior Art

Multi-phase polypropylene (PP) compositions are widely utilized for a variety of applications. For example, PP is commonly combined with non-compatible polymers, such as polyamides and ethylene-vinyl alcohol (EVOH) copolymers, to provide compositions suitable for films, coatings and moldings having improved barrier and physical properties. Similarly, PP and engineering thermoplastics are often blended to produce compositions and molded articles having improved mechanical properties. In other instances, various filler materials, such as mineral fillers, glass fibers and cellulosic fibers, are incorporated into PP to provide reinforced compositions having a desired balance of stiffness, impact strength, etc. For certain other applications, hydrated inorganic fillers are included in PP compositions to reduce flammability. In still other instances PP is combined with both a non-compatible polymer and filler material, e.g., nylons and glass fibers, to produce reinforced polymer composites.

With compositions of the above types it is a widely accepted practice to include one or more functionalized compounds, commonly referred to as coupling agents and/or compatibilizing agents, to facilitate dispersion and/or bonding of the non-compatible polymers and/or filler material with the non-polar PP polymer. In general, it is believed that the functionalized compounds interact at the interface of the components to enhance compatibility of the additive component(s) and thus increase their desirable affect and provide composites having improved properties. Functionalized compounds commonly employed as coupling/compatibilizing agents are often olefin polymers grafted with ethyleneically unsaturated carboxylic acids, hydrogenated vinyl aromatic/conjugated diene block copolymers grafted with ethylenically unsaturated carboxylic acids, olefin/acrylic ester/ethylenically unsaturated carboxylic acid terpolymers and olefin/acrylic ester/glycidyl acrylate terpolymers.

Functionalized propylene-ethylene copolymers have been disclosed as coupling/compatibilizing agents for PP compositions. Published International Publication No. WO 02/059196 A1 discloses wood fiber-filled PP compositions having improved stiffness strength and creep resistance and articles fabricated therefrom. The compositions contain 40–70 weight percent (wt. %) crystalline propylene polymer of specified NMR tacticity index and molecular weight distribution (MWD), 20–60 wt. % wood fiber and 0.3–12 wt. % functionalized olefin polymer. Whereas functionalized homopolymers of propylene are preferred, copolymers of propylene with another α-olefin, such as ethylene, are also mentioned.

Fiber-reinforced polymer compositions containing 30–90 wt. % polyamide, 5–50 wt. % glass fibers and 10–70 wt. % polyolefin, of which a portion can be an unsaturated carboxylic acid-modified polyolefin, are disclosed in U.S. Pat. No. 4,990,550. The reference indicates that the polyolefins to be modified with unsaturated carboxylic acids or their derivatives are not limited to homopolymers of α-olefins but include copolymers of different α-olefins. Random and block copolymers of propylene and other α-olefins, most notably ethylene, wherein the propylene content is 50 mol % or more and, more preferably, 80 mol % or more are specifically mentioned.

Glass-filled polyolefin compositions comprising propylene polymers of specified tacticity and MWD, an ethylene/ $C_{4-6}$ α-olefin plastomer and functionalized olefin polymer compatibility agent are also disclosed in International Publication No. WO 97/33941. Graft copolymers of propylene polymers with maleic acid are disclosed and the reference further indicates the propylene polymer portion of the graft can be a homopolymer of propylene or a copolymer of propylene with another α-olefin such as ethylene.

U.S. Pat. No. 5,514,745 discloses glass fiber reinforced molding mixtures which consist of a long glass fiber reinforced PP masterbatch and a PP resin. The long glass fiber reinforced PP is produced using glass fibers surface-finished with a finishing agent containing a coupling agent which is impregnated with a modified PP having functionality capable of reacting with the coupling agent. Carboxylic acid and anhydride-modified PP resins are disclosed as useful modified PPs for this purpose.

Polyamide/olefin polymer blend compositions containing a plurality of compatibilizing agents are disclosed in U.S. Pat. No. 5,317,059. For these compositions, which preferably are a combination of polyamide with polypropylene or a copolymer of propylene and ethylene, a first compatibilizing agent which is a terpolymer of an α-olefin, an acrylic ester and an alpha, beta-olefinically unsaturated dicarboxylic acid or glycidyl acrylate and an auxiliary compatibilizing agent selected from the group consisting of (a) at least one selectively hydrogenated block copolymer of a vinyl aromatic hydrocarbon and a conjugated diene to which has been grafted, an alpha, beta-olefinically unsaturated carboxylic acid reagent; (b) at least one polymer which is the product of the reaction of an alpha-olefin polymer and an alpha-beta-olefinically unsaturated carboxylic acid reagent; and (c) a mixture of the first compatibilizing agent with (a) and/or (b) reacted in the presence of a radical initiator. Ethylene-propylene elastomers grafted with maleic anhydride are mentioned as a type of auxiliary compatibilizing agent which can be used for the invention.

U.S. Pat. No. 5,324,755 discloses the use of polyethylene, polypropylene and copolymers of ethylene and propylene which have been chemically modified with ethyleneically unsaturated carboxylic acid or derivatives as coupling agents in compositions with propylene polymers grafted with styrenic monomer, glass fiber and, optionally, one or more rubber polymer component.

Published U.S. Patent Application U.S. 2001/0033924 A1 discloses nanocomposite concentrate compositions comprised of a layered silicate material and a polyolefin matrix polymer. The polyolefin matrix polymer is comprised of maleic anhydride-modified polyolefin and unmodified polyolefin. The layered silicate is intercalated with the matrix polymer which can be in the form of a polymer or oligomer capable of polymerization to form the polymer. The reference indicates that impact copolymers containing ethylene-propylene rubber can be used as the matrix polymer and polymer intercalate for the invention.

Whereas compositions containing maleic anhydride-modified propylene polymer coupling/compatibilizing agents have been disclosed in the prior art, there is a continuing need for propylene polymer compositions having improved properties. This and other objectives are achieved with the compositions of the present invention which are described in more detail to follow.

SUMMARY OF THE INVENTION

It is an object of the invention to provide polypropylene composites having improved physical properties. The improved multi-phase compositions of the invention contain a polypropylene base resin, a non-compatible dispersed component and a functionalized coupling/compatibilizing agent. The functionalized coupling/compatibilizing agents employed for the invention are propylene-ethylene copolymers grafted with carboxylic acids or carboxylic acid derivatives.

More specifically, the composites of the present invention are comprised of 30 to 98.5 weight percent polypropylene base resin; 1 to 70 weight percent dispersed component selected from the group consisting of filler-type materials and polymers which are incompatible with said base resin; and 0.25 to 10 weight percent propylene-ethylene impact copolymer grafted with a carboxylic acid or derivative. It is particularly advantageous when the polypropylene base resin is a highly crystalline homopolymer having a tacticity index greater than 90 and melt flow rate from 0.5 to 100 g/10 min.

The grafted propylene-ethylene impact copolymer compatibilizing/coupling agents used for the invention are reactor-made intimate mixtures of propylene homopolymer and 20 weight percent or more propylene-ethylene copolymer grafted with 1 weight percent or more graft monomer selected from the group consisting of ethylenically unsaturated carboxylic acids and carboxylic acid derivatives. Maleic anhydride is the preferred grafting monomer. Particularly useful compatibilizing/coupling agents are those wherein maleic anhydride is grafted at a weight percentage from 1.75 to 3.5 percent and the graft to melt flow rate ratio of the resulting grafted product is 0.5 or above. It is even more preferable when the propylene-ethylene impact copolymer which is grafted has an ethylene content from 5 to 30 percent and molecular weight distribution of 7 or less.

Polymers which can be employed as the dispersed component with the base resin and compatibilizing/coupling agent include ethylene-vinyl alcohol copolymers, polyamides, polyesters, polyvinylchlorides, polyvinylidene-dichlorides, ethylene-carbon monoxide copolymers and terpolymers, polycarbonates, polyethers, high impact polystyrenes, styrene-acrylonitrile copolymers and acrylonitrile-butadiene-styrene terpolymers. Composites wherein the polymeric dispersed component is a polyamide are particularly advantageous and polyamides selected from the group consisting of polytetramethylene adipamide, polyhexamethylene adipamide, polyhexamethylene azelamide, polyhexamethylene sebacamide, polyhexamethylene dodecanoamide, polycaprolactam, polybutyrolactam, polypivalolactam and poly-11-aminoundecanoic acid are preferred.

Composites wherein the dispersed component is an inorganic compound, silaceous material, cellulosic material or nanofiller are also advantageous and composites wherein the dispersed component is a fibrous cellulosic material derived from natural sources or glass fiber are particularly advantageous.

DETAILED DESCRIPTION

The improved multi-phase compositions of the invention comprise a polypropylene resin, a dispersed component and a functionalized propylene-ethylene copolymer. When used herein, the term "base resin" refers to the polypropylene resin component. The terms "dispersed component" and "reinforcing components/agents" as used herein refer to filler materials and/or polymer components which are incompatible with the base resin. The terms "functionalized component," "coupling agent," "compatibilizing agent" and "dispersing agent" are used interchangeably herein and all refer to the functionalized propylene-ethylene copolymer component. Unless otherwise specified, all weights and percentages referred to herein are on a weight basis.

Polypropylene base resins utilized for the invention are any of the known highly crystalline isotactic propylene homopolymers. These resins, typically have tacticity indexes (as measured by NMR) greater than 90 and, more preferably, greater than 94. The polypropylene base resins also have melt flow rates (MFRs) from about 0.5 up to about 100 g/10 min. MFRs referred to herein are determined in accordance with ASTM D 1238, Condition L (2.16 kg load at 230° C.). Preferred base resins utilized for the compositions of the invention have MFRs in the range 2 to 50 g/10 min.

The multi-phase compositions of the invention contain one or more components which are not readily compatible or incompatible with the polypropylene base resin. The dispersed component may be a filler-type material or another polymer which, by virtue of its polarity, is not compatible with the polypropylene. The amount and type of dispersed component will depend on the intended end-use application of the composition.

Dispersed agents which can be employed for the compositions of the invention include inorganic and organic materials commonly used as reinforcing materials. These include both naturally derived and synthetically produced materials selected from the group consisting of inorganic compounds, siliceous materials, cellulosic materials and nanofillers.

Useful inorganic and siliceous materials include hydrated aluminum oxides, hydrated magnesia, calcium carbonate, hydrated calcium silicate, zinc borate, magnesium silicate and hydrated magnesium silicate, silica gel, fumed silica, talc, quartz, mica, clays such as bentonite, montmorillonite, attapulgite, kaolinite, etc., glass fiber and the like.

Useful nanofillers include any of the known filler materials having a particle size in the nanometer range including $SiO_2$, SiC(nanowhiskers), carbon nanotubes and nanoclays.

Cellulosic materials employed for the compositions of the invention can be obtained from a variety of natural sources. Fibers derived from sugar cane, pulp, hemp, kenaf, flax, jute, sisal and the like can be used, as may pulverized peanut shells, cherry pit flour and the like. Wood fiber, e.g., wood flour, is also useful and is available from a variety of sources. Cellulose pulps and particularly those having an α-cellulose purity greater than 80% are a highly useful class of reinforcing agents for the compositions of the invention. Such cellulosic fiber materials are described in detail in U.S. Pat. No. 6,270,883 which is incorporated herein by reference.

PP compositions containing glass fibers such as yarns, rovings, chopped strands, etc., are also a highly useful embodiment of this invention. Glass fiber for reinforcing agents produced as chopped strands can range in length from about ⅛ to about 1 inch and, more preferably, from 3/16 to ½ inch with diameters from about 5 to 20 micrometers (μm).

Composites of the invention are equally advantageous for the production of long and/or continuous fiber reinforced parts produced by processes such as pulltrusion, pushtusion or extrusion. Technologies wherein long and/or continuous length fibers are fed during the molding operation are widely employed for traditional and specialty composite applications.

The glass fibers may be surface treated with various sizing agents, most commonly, silane compounds and other functional monomers. Commonly used silane sizing agents include vinyltrichlorosilane, vinyltris(beta-methoxyethoxy)silane, vinyltriethoxysilane, gamma-methacryloxypropyl-trimethoxysilane, beta-(3,4-epoxycyclohexyl)ethyltrimetoxysilane, gamma-glycidoxy-propyltrimetoxysilane, N-(beta-aminoethyl)-gamma-aminopropyl-methyldimethoxysilane, gamma-aminopropyltriethoxysilane, N-phenyl-gamma-aminopropyltrimethoxysilane, gamma-chloropropyl-trimethoxysilane and the like.

PP compositions containing fibrous cellulosic and/or glass reinforcing agents are a highly useful embodiment of the invention. Whereas glass fibers are extensively used as reinforcing agents for thermosets and thermoplastics to provide composites having high stiffness, high strength, dimensional stability and heat resistance, they do have the disadvantage of being significantly heavier than cellulosic fibers. Also, glass fibers can abrade processing equipment. For this reason, cellulosic fiber reinforced composites are increasingly being used for automotive molding applications and building/structural applications where lightweighting is an important consideration.

As heretofore indicated, the dispersed component can also be another polymer, different than the base resin and which is incompatible therewith. Polymeric dispersed components of this type are typically polymers possessing sufficient polarity so as not to be readily incorporated into the non-polar polypropylene base resin. Such resins include ethylene-vinyl alcohol (EVOH) copolymers, polyamides (PA), polyesters such as polyethylene terephthalates (PET), polyvinylchloride (PVC), polyvinylidenedichlorides (PVDC), ethylene-carbon monoxide (ECO) copolymers and terpolymers, polycarbonates, polyethers such as polyphenyleneoxide (PPO) or polyacetal, high impact polystyrene (HIPS), styrene-acrylonitrile (SAN), acrylonitrile-butadiene-styrene (ABS), and the like.

In one preferred embodiment of the invention where the dispersed component is a polymer, the polymer is a polyamide. Useful polyamides are obtained by the condensation of $C_{4-12}$ dicarboxylic acids with $C_{4-16}$ diamines or by ring-opening polymerization of cyclic lactams. Particularly useful polyamides for the compositions of the invention include polytetramethylene adipamide (nylon 4,6), polyhexamethylene adipamide (nylon 6,6), polyhexamethylene azelamide (nylon 6,9), polyhexamethylene sebacamide (nylon 6,10), polyhexamethylene dodecanoamide (nylon 6,12), polycaprolactam (nylon 6), polybutyrolactam, polypivalolactam and poly-11-aminoundecanoic acid.

A functionalized propylene-ethylene copolymer is included with the propylene polymer base resin and dispersed component to obtain the improved multi-phase compositions of the invention. More specifically, propylene-ethylene impact copolymers grafted with carboxylic acids or carboxylic acid derivatives and having high graft concentrations and relatively low MFRs are employed as the coupling/compatibilizing agent.

Functionalized components useful for the invention having the desired balance of high graft monomer content and relatively low MFR are produced by grafting specific propylene-ethylene copolymers, namely, copolymers of propylene and ethylene produced in gas-phase, stirred-bed, multistage polymerization processes. These copolymers, referred to herein as impact copolymers, are reactor-made intimate mixtures of propylene homopolymer and propylene-ethylene copolymer. Most typically they are produced in two reactors connected in series using high activity supported transition metal catalysts. Propylene homopolymer is produced in the first reactor and then introduced to the second reactor where additional propylene, ethylene, hydrogen and catalyst, as necessary, are metered to produce the intimate physical mixtures which comprise the propylene-ethylene impact copolymers utilized for the invention. Gas phase polymerizations of this type are described in the article by Ross, et al., entitled "An Improved Gas-Phase Polypropylene Process" in *Ind. Eng. Chem. Prod. Res. Dev.* 1985, 24, 149–154, which is incorporated herein by reference.

Propylene-ethylene impact copolymers produced in gas-phase polymerizations of the above types are comprised of crystalline (propylene homopolymer) and amorphous or rubber (ethylene-propylene copolymer) phases. The ethylene content of the propylene-ethylene copolymer can vary over a wide range. Accordingly, the term impact copolymers is also intended to encompass thermoplastic polyolefins (TPOs) and thermoplastic elastomers (TPEs). Ethylene contents of the copolymers generally range from 5 to 30% and, more preferably, from 6 to 25%.

Grafting monomers used include at least one polymerizable, ethylenically unsaturated carboxylic acid or acid derivative, such as an acid anhydride, ester, salt or the like. Such monomers include but are not necessarily limited to the following: acrylic acid, methacrylic acid, maleic acid, fumaric acid, itaconic acid, citraconic acid, mesaconic acid, maleic anhydride, 4-methyl cyclohex-4-ene-1,2-dicarboxylic acid anhydride, bicyclo(2.2.2)oct-5-ene-2,3-dicarboxylic acid anhydride, 1,2,3,4,5,8,9,10-octahydronaphthalene-2,3-dicarboxylic acid anhydride, 2-oxa-1,3-diketospiro(4.4)non-7-ene, bicyclo(2.2.1)hept-5-ene-2,3-dicarboxylic acid anhydride, maleopimaric acid, tetrahydrophthhalic anhydride, norborn-5-ene-2,3-dicarboxylic acid anhydride, Nadic anhydride, methyl Nadic anhydride, Himic anhydride, methyl Himic anhydride, and x-methylbicyclo(2.2.1)hept-5-ene-2,3-dicarboxylic acid anhydride(XMNA). Maleic anhydride is a preferred grafting monomer.

By grafting propylene-ethylene impact copolymers having high rubber contents and narrow molecular weight distributions (MWDs) it is possible to obtain functionalized components having high graft contents and relatively low MFRs. To achieve these results, propylene-ethylene impact copolymers having rubber contents of 20% or greater and MWDs of 7 or below are employed. It is even more preferable when propylene-ethylene impact copolymers with rubber contents of 25% or more and MWDs of 6 or below are grafted. Especially useful functionalized products for the invention are obtained when impact copolymers of these types are grafted with maleic anhydride.

Grafting is accomplished by melt blending the propylene-ethylene impact copolymers in the substantial absence of a solvent with a free radical generating catalyst, such as a peroxide, in the presence of the grafting monomer in a shear-imparting reactor, such as an extruder/reactor. Twin screw extruder/reactors such as those marketed by Coperion (formerly Werner-Pfleiderer) under the designations ZSK-53, ZSK-83 and ZSK-90 are commonly used.

In one embodiment, peroxide catalyst is introduced to the molten polymeric composition followed by introduction of the grafting monomer. The grafting monomer may be introduced at a slightly higher temperature. The grafting reaction is carried at a temperature selected to minimize or avoid rapid vaporization and/or decomposition and the consequent losses of catalyst and monomer. The monomer typically constitutes about 1 to about 5% of the reaction mixture.

A temperature profile wherein the temperature is gradually increased over the length of the extruder/reactor up to a maximum in the grafting reaction zone and then decreases toward the reactor exit is preferred. Temperature attenuation is desirable for pelletizing purposes. The maximum temperature within the reactor should be such that significant vaporization losses and/or premature decomposition of peroxide catalyst is avoided. For example, with di-t-butyl peroxide and 2,5-dimethyl-2,5-di-(t-butylperoxy) hexane, maximum temperatures within the reactor should be maintained at or below about 220° C. In contrast, the so-called "thermal" grafting processes of the prior art which do not include catalysts, may use temperatures up to about 380° C. The maximum useful temperature varies with the selection of catalyst. Examples of useful peroxide catalysts include: 1,1-bis(tert-butylperoxy)cyclohexane; n-butyl-4,4-bis(tert-butylperoxyvalerate); 1,1-bis(tert-butylperoxy)-3,3,5-trimethylcyclohexane; 2,2-bis(tert-butylperoxy)butane; dicumylperoxide; tert-butylcumylperoxide; α,α'-bis(tert-butylperoxypreoxy-isopropyl) benzene; di-tert-butylperoxide (DTBP); 2,5-dimethyl-2,5-di(tert-butylperoxy) hexane; and the like. Since substantial amounts of solvent are to be avoided, the catalyst and monomer are preferably added in neat form to the reactor. Additional details regarding the grafting procedure and reactor extruder are provided in U.S. Pat. No. 5,367,022 which is incorporated herein by reference.

By using high rubber content, narrow MWD propylene-ethylene impact copolymers, it is possible to consistently obtain graft to MFR ratios of 0.5 or higher with products having 2% or more ethylenically unsaturated carboxylic acid or derivative grafted. The graft to MFR ratio is determined using the formula:

(weight percent monomer grafted÷$MFR$)×100

For example, a grafted product having 2% maleic anhydride grafted and an MFR of 20 would have a ratio of 10. As used herein, the terms graft, grafted and grafting denote covalent bonding of the monomer to the propylene-ethylene copolymer chain.

In general, the functionalized impact copolymer will have at least 1% acid or acid derivative grafted. More typically the grafted impact copolymer will contain 1.75 to 3.5% and, more preferably, 2 to 3% of the graft monomer and the graft to MFR ratio will be 0.5 or higher and, more preferably, 1 or above. Grafted impact copolymers having graft to MFR ratios of 1 and above are disclosed in U.S. Pat. No. 6,716, 928 which is incorporated herein by reference.

PP compositions formulated using high graft to MFR ratio dispersing agents from a highly useful embodiment of the invention. While functionalized graft copolymers having lower graft levels and lower graft to MFR ratios can also be utilized, the use of grafted products having higher functionality and MFRs heretofore generally associated with lower graft content materials is highly advantageous. In addition to significant performance enhancement, composites produced in accordance with the invention also exhibit significantly improved resistance to phase separation. It is also possible to use less of the functionalized material resulting in considerable economic benefit.

The compositions of the invention contain from 30 to 98.5% and, more preferably, 50 to 95% polypropylene base resin. The non-compatible polymer and/or filler is utilized in an amount sufficient to impart the desired properties, e.g., increase stiffness as measured by flexural modulus, but generally will be in the range 1 to 70%. More preferably, the dispersed component will comprise 2.5 to 60% of the composition. The coupling/compatibilizing agent is present from 0.25 to 10% and, more preferably, from 0.5 to 5%. All of the above percentages are based on the total weight of the composition.

In one highly useful embodiment where glass fiber reinforcing materials are used, the composite will contain 5 to 50% and, more preferably, 10 to 40% of the dispersed component. In another highly useful embodiment where the dispersed component is a cellulosic material, the cellulosic component will constitute 40 to 70% and, more preferably, 50 to 60% of the composite. In yet another preferred embodiment where the dispersed component is a nylon or polyester polymer, the dispersed component will be present in an amount from 1 to 30% and, more preferably, from 5 to 20%.

Compositions of the invention may also contain other additives and components known to the art to improve processability, stability and appearance. Such additives include foaming agents, thermal and oxidation stabilizers, plasticizers, ultraviolet light stabilizers, lubricants, mold release agents, flame retardants, colorants, dyes, pigments and the like.

The components, and such other additives as may be used, can be blended and extruded in accordance with known and generally accepted practices using conventional equipment commonly employed in the resin compounding arts. The compositions can be further fabricated by melt extrusion, injection or compression molding or the like to obtain the finished products.

The following examples illustrate the invention; however, those skilled in the art will recognize many variations that are within the spirit of the invention and scope of the claims.

EXAMPLE 1

Preparation of Grafted Propylene-Ethylene Impact Copolymer

A grafted propylene-ethylene impact copolymer having a high graft monomer (maleic anhydride) content and relatively low MFR was prepared in accordance with the general procedure described in copending U.S. application Ser. No. 10/222,568.

The propylene-ethylene impact copolymer used for the grafting operation contained 14.8 wt. % ethylene and had an MFR of 1 g/10 min. The impact copolymer was comprised of a crystalline phase (isotactic polypropylene homopolymer) and a rubbery phase (EPR). The impact copolymer contained approximately 30 wt. % ethylene-propylene copolymer (EPR). The MWD (Mw/Mn) of the impact copolymer was 5.

Grafting was carried out using maleic anhydride in a Werner-Pfleiderer Model ZSK-90 twin-screw extruder/reactor having multiple zones with screen changer, die plate and polymer pellet feed and reactant supply metering equipment. The reactor/extruder was connected to a strand pelletizer. Temperatures in the heating/mixing zones ranged from 350° F. up to a maximum of 430° F. Temperature in the final heating/mixing stages and at the extruder die plate was 390° F. Screw speed was maintained at 300 rpm and reactor throughput was approximately 1000 lb/hr. Organic peroxide catalyst feed rate was controlled to achieve the desired graft levels. The maleic anhydride was charged to the extruder/reactor at a 3% level, based on the impact copolymer feed rate, and the organic peroxide used (6.2%) was LUPEROX 101 (2,5-dimethyl-2,5-di(t-butylperoxy)hexane). The amount of maleic anhydride grafted was 2.17% as determined by FTIR. The MFR of the grafted impact copolymer was 350 g/10 min. The graft to MFR ratio of the grafted impact copolymer calculated based on the above values was 0.62.

Preparation of Grafted Propylene-Ethylene Impact Copolymer Concentrates

Concentrate blends of the above-prepared copolymer graft were prepared for utilization for the formulation of various composites. Three blends of the maleic anhydride grafted impact copolymer and polypropylene homopolymer (MFR 5) were prepared. The concentrates were prepared by melt-blending the components using a 30 mm twin screw extruder with co-rotating intermeshing screws and five heating zones from 200° F. up to 420° F. The extruder was fitted with a heated die maintained at 420° F. The compositional makeup of the three blends, identified as Blend A, Blend B and Blend C, and the maleic anhydride content of the blends were as follows:

|  | Blend A | Blend B | Blend C |
|---|---|---|---|
| % PP homopolymer | 40 | 50 | 60 |
| % Grafted Impact Copolymer | 60 | 50 | 40 |
| Maleic Anhydride Content | 0.78 | 1.09 | 1.45 |

Preparation of Talc-Filled Polypropylene Compositions

Polypropylene composites were prepared using each of the above-prepared concentrate blends, i.e., Blends A, B and C. In each case 2% of the concentrate blend was combined with 68% of a 12 MFR polypropylene homopolymer and 30% talc. The PP base resin contained 975 ppm of a stabilizer package, 850 ppm calcium stearate and 2500 ppm glycerol monostearate. The talc had an average particle size of 10 microns. The composites, respectively identified as 1A, 1B and 1C, were prepared by melt-blending the components in a 50 mm twin screw (counter rotating; intermeshing) extruder. Maleic anhydride contents of compositions 1A, 1B and 1C were 0.016%, 0.022% and 0.029%, respectively. Test specimens were injection molded from each of the three composites using a Battenfeld 230E injection molder in accordance with ASTM D 3651-97 and evaluated for heat deflection temperature (HDT) in accordance with ASTM D 648-00, flexural modulus (2% Sec) in accordance with ASTM D 790-00, tensile strength at break and at yield per ASTM D 638-00 and Izod impact (un-notched) per ASTM D 256-00. Test results were as follows:

|  | 1A | 1B | 1C |
|---|---|---|---|
| HDT (° C.) | 147 | 146 | 147 |
| Flexural Modulus (PSI) | 361,800 | 362,700 | 361,600 |
| Tensile Strength at Break (PSI) | 5,580 | 5,590 | 5,630 |
| Tensile Strength at Yield (PSI) | 6,000 | 6,040 | 6,040 |
| Izod Impact (ft-lbs/in) | 7.87 | 8.06 | 7.89 |

The significant improvement in mechanical properties achieved with the above-composites prepared using the functionalized components of the invention is readily apparent by comparison with a composite identically prepared and tested but which contained no grafted impact copolymer. The composition comprised of 70% PP and 30% talc had a HDT of 140° C., flexural modulus of 312,200 PSI, tensile strength at break of 4,670 PSI, tensile strength at yield of 5,410 PSI and Izod impact of 6.1 ft-lb/in.

EXAMPLE 2

Following the procedures describe in Example 1, glass-filled PP compositions were prepared and evaluated using concentrate blends A, B and C. The PP base resin used was the same as for Example 1. Glass fibers used had a length of 3.2 mm. Three composites, identified as 2A, 2B and 2C, were prepared using 2% concentrate blends A, B and C, respectively, 68% PP base resin and 30% glass fibers. The maleic anhydride content (wt. %) for each of the compositions is provided in the table which follows. Also included for testing was a control composition containing 70% PP base resin and 30% glass fibers. Test results obtained for composites 2A, 2B and 2C and the control composite containing no coupling agent were as follows:

|  | 2A | 2B | 2C | Control |
|---|---|---|---|---|
| Maleic Anhydride Content (%) | 0.016 | 0.022 | 0.029 | 0 |
| HDT (° C.) | 161 | 162 | 162 | 152 |
| Flexural Modulus (PSI) | 751,900 | 756,100 | 745,400 | 635,400 |
| Flexural Strength at Break (PSI) (ASTM D 790-00) | 19,000 | 18,784 | 18,260 | 14,653 |
| Tensile Strength at Break (PSI) | 12,920 | 12,990 | 12,830 | 10,480 |
| Elongation at Break (%) (ASTM D 638-00) | 2.8 | 2.8 | 3.1 | 1.8 |
| Tensile Toughness (PSI) (ASTM D 638-00) | 254 | 255 | 292 | 121 |
| Izod Impact (ft-lbs/in) | 12.23 | 11.52 | 11.81 | 5.85 |

It is apparent from the above data that significant improvement in mechanical properties is obtained with the compositions of the invention containing low levels of the functionalized impact copolymer. Similar improvements in mechanical properties are obtained utilizing maleic anhydride grafted impact copolymers having higher graft to MFR ratios.

COMPARATIVE EXAMPLE 3

To further demonstrate the improved results obtained utilizing the maleic anhydride grafted impact copolymers of the invention, a glass filled composition containing 68% PP homopolymer, 30% glass fiber and 2% of a concentrate blend prepared using a commercially available maleated polypropylene homopolymer coupling agent was prepared and evaluated. The commercial coupling agent contained 8% maleic anhydride and had an Mw of 9100. The PP and glass fiber used were the same as for Example 2. The resulting composite had a maleic anhydride content of 0.16%. Test results for the comparative formulation were as follows:

| | |
|---|---:|
| HDT (° C.) | 161 |
| Flexural Modulus (PSI) | 735,800 |
| Flexural Strength at Break (PSI) | 17,420 |
| Tensile Strength at Break (PSI) | 12,070 |
| Elongation at Break (%) | 2.4 |
| Tensile Toughness (PSI) | 200 |
| Izod Impact (ft-lbs/in) | 8.68 |

In spite of the significantly higher maleic anhydride content of the comparative composite versus inventive compositions 2A, 2B or 2C, the mechanical properties were significantly lower for the composite prepared using the commercial coupling agent. The improved impact properties of the composites of Example 2 compared to those of the comparative composite are particularly noteworthy.

EXAMPLE 4

In accordance with the procedure of Example 1, mica-filled PP compositions were prepared utilizing the maleic anhydride grafted impact copolymer coupling agents. Concentrate blends A, B and C were employed at a 2% level with 68% PP homopolymer and 30% mica (Suzorite 325-HK-1200) and the respective composites identified as 4A, 4B and 4C. The three composites of the invention and a control composition which contained no coupling agent were evaluated with the following results:

| | 4A | 4B | 4C | Control |
|---|---:|---:|---:|---:|
| HDT (° C.) | 147 | 148 | 146 | 136 |
| Flexural Modulus (PSI) | 407,100 | 409,600 | 411,600 | 341,400 |
| Izod Impact (ft-lbs/in) | 5.72 | 4.65 | 4.98 | 4 |

Significant improvement in mechanical properties was obtained with the compositions of the invention formulated using the maleic anhydride grafted impact copolymer coupling agent.

EXAMPLE 5 AND COMPARATIVE EXAMPLE 6

Composites were prepared by blending polypropylene (5 MFR) and nylon 6. The composite of the invention (Example 5) contained 88% polypropylene, 10% nylon 6 and 2% compatibilizer concentrate (Blend A). The maleic anhydride content of the composite was 0.016%. For comparison, a composite comprising 88% polypropylene, 10% nylon 6 and 2% of the concentrate blend of Comparative Example 3 obtained using the commercial maleated polypropylene homopolymer was also prepared. This comparative composite contained 0.16% maleic anhydride. A control which contained no compatibilizer was also prepared. Physical properties of the composite of the invention, the comparative composite and the control formulation were determined and are set forth in the table which follows. Test specimens used for the testing were injection molded in accordance with the procedure described in Example 1.

| | Ex 5 | Comparative Ex. 6 | Control |
|---|---:|---:|---:|
| Flexural Modulus (PSI) | 256,000 | 252,300 | 224,400 |
| Tensile Strength at Yield (PSI) | 5,790 | 5,760 | 5,170 |
| Elongation at Break (%) | 11.0 | 8.1 | 8.1 |
| Notched Impact @ 23° C. (ft-lb/in) | 0.74 | 0.52 | 0.61 |
| Notched Impact @ −18° C. (ft-lb/in) | 0.31 | 0.25 | 0.30 |
| Dynatup @ 23° C. (ft-lb/in) (ASTM D 3763) | 2.51 | 1.63 | 1.60 |
| Dynatup @ −18° C. (ft-lb/in) (ASTM D 3763) | 2.28 | 2.07 | 1.43 |

We claim:
1. A composition comprising
  (1) 30 to 98.5 weight percent highly crystalline polypropylene base resin having a tacticity index greater than 90 and melt flow rate from 0.5 to 100 g/10 min.;
  (2) 1 to 70 weight percent polymers which is incompatible with said base resin selected from the group consisting of ethylene-vinyl alcohol copolymer, polyamide, polyester, polyvinylchloride, polyvinylidenedichloride, ethylene-carbon monoxide copolymer and terpolymer, polycarbonate, polyether, high impact polystyrene styrene-acrylonitrile copolymer and acrylonitrile-butadiene-styrene terpolymer; and
  (3) 0.25 to 10 weight percent grafted propylene-ethylene impact copolymer having an ethylene content from 5 to 30 percent and molecular weight distribution of 7 or less and which is a reactor-made intimate mixture of propylene homopolymer and 20 weight percent or more propylene-ethylene copolymer grafted with 1 weight percent or more maleic anhydride.

2. The composition of claim 1 wherein the tacticity index of the polypropylene base resin is greater than 94 and melt flow rate is from 2 to 50 g/10 min.

3. The composition of claim 1 wherein the graft monomer content is 1.75 to 3.5 weight percent and the graft to melt flow rate ratio of the grafted impact copolymer determined in accordance with the formula (Weight Percent Monomer Grafted÷Melt Flow Rate)×100 is 0.5 or above.

4. The composition of claim 1 comprising 50 to 95 weight percent polypropylene base resin, 2.5 to 60 weight percent incompatible polymer and 0.5 to 5 weight percent grafted propylene-ethylene impact copolymer.

5. The composition of claim 1 wherein the incompatible polymer is a polyamide selected from the group consisting of polytetramethylene adipamide, polyhexamethylene adipamide, polyhexamethylene azelamide, polyhexamethylene sebacamide, polyhexamethylene dodecanoamide, polycaprolactam, polybutyrolactam, polypivalolactam and poly-11-aminoundecanoic acid.

6. The composition of claim 5 comprising 50 to 95 weight percent polypropylene base resin, 1 to 30 weight percent polyamide and 0.5 to 5 weight percent grafted propylene-ethylene impact copolymer.

7. The composition of claim 6 wherein the polyamide is polycaprolactam.

\* \* \* \* \*